US011972329B2

(12) United States Patent
Eldardiry et al.

(10) Patent No.: US 11,972,329 B2
(45) Date of Patent: Apr. 30, 2024

(54) METHOD AND SYSTEM FOR SIMILARITY-BASED MULTI-LABEL LEARNING

(71) Applicant: Palo Alto Research Center Incorporated, Palo Alto, CA (US)

(72) Inventors: Hoda M. A. Eldardiry, San Carlos, CA (US); Ryan A. Rossi, Mountain View, CA (US)

(73) Assignee: Xerox Corporation, Norwalk, CT (US)

(*) Notice: Subject to any disclaimer, the term of this patent is extended or adjusted under 35 U.S.C. 154(b) by 779 days.

(21) Appl. No.: 16/237,439

(22) Filed: Dec. 31, 2018

(65) Prior Publication Data
US 2020/0210888 A1 Jul. 2, 2020

(51) Int. Cl.
*G06N 20/00* (2019.01)
*G06N 5/048* (2023.01)

(52) U.S. Cl.
CPC ............. *G06N 20/00* (2019.01); *G06N 5/048* (2013.01)

(58) Field of Classification Search
CPC ................................ G06N 5/048; G06N 20/00
See application file for complete search history.

(56) References Cited

U.S. PATENT DOCUMENTS

2011/0302111 A1* 12/2011 Chidlovskii ........... G06N 20/00
706/12

OTHER PUBLICATIONS

Similarity-based Multi-label Learning taken from https://arxiv.org/pdf/1710.10335v1.pdf (Year: 2017).*
MI-knn: A Lazy Learning Approach toMulti-Label Learning taken from http://citeseerx.ist.psu.edu/viewdoc/download?doi=10.1.1.89.7148&rep=rep1&type=pdf (Year: 2007).*
Score Normalization and Aggregation for Active Learning in Multi-label Classification taken from https://www.researchgate.net/publication/222089355_Score_Normalization_and_Aggregation_for_Active_Learning_in_Multi-label_Classification (Year: 2010).*
ML-CLUBAS: A Multi Label Bug Classification Algorithm taken from https://file.scirp.org/Html/2-9301529_26203.htm (Year: 2012).*
A Fuzzy Similarity-Based Approach for Multi-label Document Classification taken from https://www.researchgate.net/publication/232625068_A_Fuzzy_Similarity-Based_Approach_for_Multi-label_Document_Classification (Year: 2009).*
Tsoumakas, Grigorios, Ioannis Katakis, and Ioannis Vlahavas. "Effective and efficient multilabel classification in domains with large number of labels." Proc. ECML/PKDD 2008 Workshop on Mining Multidimensional Data (MMD'08). vol. 21. 2008. (Year: 2008).*

(Continued)

*Primary Examiner* — Benjamin P Geib

(57) ABSTRACT

A system is provided for facilitating multi-label classification. During operation, the system maintains a set of training vectors. A respective vector represents an object and is associated with one or more labels that belong to a label set. After receiving an input vector, the system determines a similarity value between the input vector and one or more training vectors. The system further determines one or more labels associated with the input vector based on the similarity values between the input vector and the training vectors and their corresponding associated labels.

20 Claims, 5 Drawing Sheets

(56) References Cited

OTHER PUBLICATIONS

Madhieh Abbasi et al. "Robustness to Adversarial Examples Through and Ensemble of Specialists" Computer Vision and Systems Laboratory, Electrical and Computer Engineering Department Universite Laval, Quebec, Canada, Mar. 10, 2017.
Naveed Akhtar et al. "Threat of Adversarial Attacks on Deep Learning in Computer Vision: A Survey", School of Computer Science and Software Engineering, University of Western Australia, Feb. 26, 2018.
Maria-Florina Balcan et al. "Agnostic Active Learning", Jun. 13, 2008.
Alexander Bagnall et al. "Training Ensembles to Detect Adversarial Examples", Dec. 11, 2017.
Battista Biggio et al. "Wild Patterns: Ten Years After the Rise of Adversarial Machine Learning", Jul. 19, 2018.
Anirban Chakraborty et al. "Adversarial Attacks and Defences: A Survey", Sep. 28, 2018.
Nicholas Carlini et al. "Towards Evaluating the Robustness of Neural Networks", Mar. 22, 2017.
Yoav Freund et al. "Selective Sampling Using the Query by Committee Algorithm", Machine Learning, 28, 133-168 (1997), 1997 Kluwer Academic Publishers.
Ian J. Goodfellow et al. "Explaining and Harnessing Adversarial Examples", Mar. 20, 2015.
Steve Hanneke "Rates of Convergence in Active Learning", The Annals of Statistics, 2011, vol. 39, No. 1, 333-361, nstitute of Mathematical Statistics, 2011.
Haym Hirsh "Theoretical Underpinnings of Version Spaces", Computer Science Department Rutgers University, tew Brunswick, NJ.
Ralf Herbrich et al. "Bayes Point Machines", 2001.
KEBANA "Robust Arrangements of Classifiers in Version Space".
Qiang Liu "A Survey on Security Threats and Defensive Techniques of Machine Learning: A Data Driven View", IEEE Feb. 2018.
Yu Li "On the Decision Boundary of Deep Neural Networks", Jan. 1, 2019.
Tessa Lau "Programming by Demonstration Using Version Space Algebra", Machine Learning, 53,111-156, 2003.
Tom M. Mitchell "Generalization as Search", Computer Science Department, Rutgers University.
Seyed-Mohsen Moosavi-Dezfooli "DeepFool: a simple and accurate method to fool deep neural networks" Jul. 4, 2016.
Aamir Mustafa "Adversarial Defense by Restricting the Hidden Space of Deep Neural Networks" Jul. 28, 2019.
Nicolas Papernot "Distillation as a Defense to Adversarial Perturbations against Deep Neural Networks" IEEE 2016, Mar. 14, 2016.
Shantanu Rane"A Version Space Perspective on Differentially Private Pool-Based Active Learning", Downloaded Aug. 28, 2020.
Daniel Soudry "The Implicit Bias of Gradient Descent on Separable Data", Journal of Machine Learning Research 19(2018), Dec. 28, 2018.
Uiawei Su "One Pixel Attach for Fooling Deep Neural Networks" Oct. 17, 2019.
Yichuan Tang "Deep Learning using Linear Support Vector Machines", Feb. 21, 2015.
Simon Tong "Support Vector Machine Active Learning with Applications to Text Classification", Journal of Machine .Learning Research (2001).
Florian Tramer "Ensemble Adversarial Training: Attacks and Defenses" ICLR 2018, Apr. 26, 2020.
Yan Zhou "Breaking Transferability of Adversarial Samples with Randomness", Jun. 17, 2018.

* cited by examiner

METHOD AND SYSTEM FOR SIMILARITY-BASED MULTI-LABEL LEARNING

BACKGROUND

Field

This disclosure is generally related to the field of machine learning. More specifically, this disclosure is related to a method and system for similarity-based multi-label learning.

Related Art

Multi-label classification is an important and challenging learning problem with applications in bioinformatics, image and video annotation, text classification, online advertising, and query/tag/keyword suggestions. The goal of multi-label classification is to predict a K-dimensional binary label vector $y \in \{0,1\}^K$ for a given unseen data point x where x is an M-dimensional feature vector.

Previous work has mainly focused on reducing the multi-label problem to a more standard one such as multi-class and binary classification, ranking and regression. Standard multi-class approaches can be used by mapping a multi-label problem with K labels to a classification problem with 2K labels. Binary classification methods can also be used by copying each feature vector K times and for each copy k an additional dimension is added with value k; and the training label is set to 1 if label k is present, and 0 otherwise. Rank-based approaches attempt to rank the relevant labels higher than irreverent ones whereas regression methods map the label space onto a vector space where standard regression methods are applied. Some existing methods include a kNN-based multi-label approach called ML-kNN, a boosting-based multi-label method called BoosTexter, a multi-label decision tree approach called Adtboost:MH. Moreover, previous work has also provided an indirect extension of Support Vector Machine (SVM) to multi-label classification called RankSVM. However, many of these existing methods require extensive training based on a training dataset. As a result, the amount of computational resources required, such as processing power and memory, can be prohibitively expensive as the training dataset becomes larger.

SUMMARY

Embodiments described herein provide a system for facilitating multi-label classification. During operation, the system maintains a set of training vectors. A respective vector represents an object and is associated with one or more labels that belong to a label set. After receiving an input vector, the system determines a similarity value between the input vector and one or more training vectors. The system further determines one or more labels associated with the input vector based on the similarity values between the input vector and the training vectors and their corresponding associated labels.

In a variation on this embodiment, prior to determining the labels associated with the input vector, the system aggregates and normalizes the similarity values and associating the normalized similarity value to the labels that are associated with the training vectors for which a similarity value has been calculated.

In a further variation, the system ranks the labels based on their associated normalized similarity values.

In a variation on this embodiment, prior to determining the similarity values, the system samples the set of training vectors to select a subset of training vectors that represent the set of labels, thereby reducing computational complexity for the subsequent determination of the similarity values.

In a variation on this embodiment, the system predicts a number of the labels associated with the input vector based on the similarity values.

In a variation on this embodiment, the labels are organized in one or more hierarchies.

In a further variation, subsequent to a high-level label being determined to be associated with the input vector, the system performs a second round of similarity-based determination process to determine one or more sub-labels corresponding to the high-level label.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Embodiments of the present invention provide a similarity-based approach for the multi-label learning problem, which is referred to as the SML method herein, that gives rise to a new class of methods for multi-label classification. SML is accurate with low variance, amenable to streaming data and online learning, naturally able to handle changes in the problem domain, robust to training data with skewed/unbalanced class label sets, and facilitates an efficient parallel implementation. Furthermore, embodiments of the present invention also provide a similarity-based set size prediction method for predicting the number of labels associated with an unknown test instance x. Experiments on a number of data sets demonstrate the effectiveness of SML as it compares favorably to existing methods across a wide range of evaluation criterion. The experimental results indicate the practical significance of SML.

In addition, SML is a direct approach for multi-label learning. This is in contrast to existing methods that are mostly indirect approaches that transform the multi-label problem to a binary, multi-class, or regression problem and apply standard methods (e.g., decision trees). Furthermore, other rank-based approaches such as RANK-SVM are also indirect extensions of SVM to multi-label classification. Notably, SML completely avoids such mappings (required by SVM) and is based on the more general notion of similarity.

Figure 1:
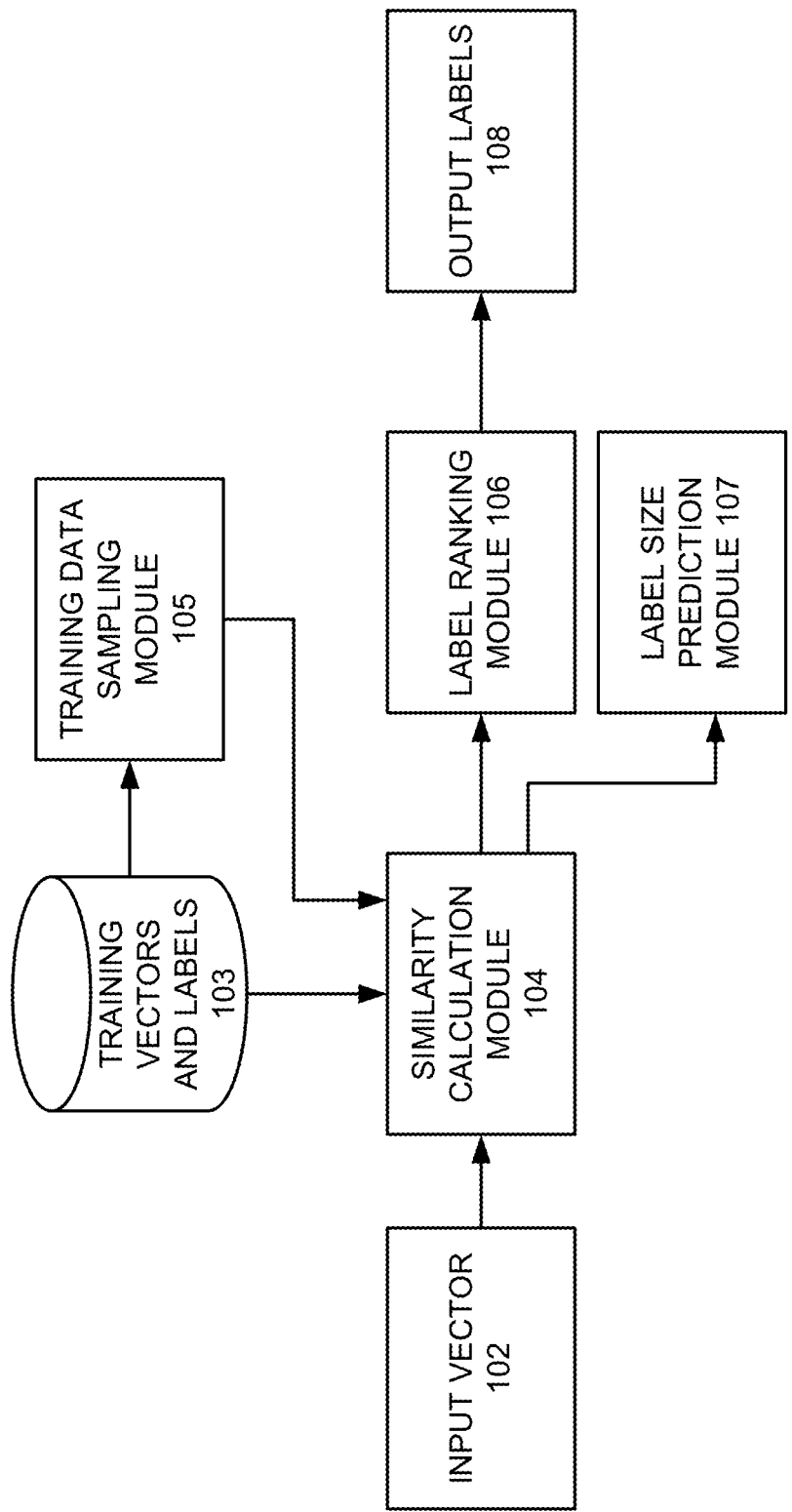
FIG. 1 presents an exemplary system that facilitates similarity-based multi-label classification, in accordance with an embodiment of the present invention.

FIG. 1 presents an exemplary system that facilitates similarity-based multi-label classification, in accordance with an embodiment of the present invention. In this example, the system includes a similarity calculation module 104, a label ranking module 106, and optionally a training data sampling module 105. During operation, similarity calculation module 104 receives an input vector 102, which represents an object such as an image, a document, a web page, etc. The goal of the system is to identify a number of labels associated with input vector 102.

During operation, similarity calculation module 104 computes a similarity value between input vector 102 and each training vector selected from a library 103 of training vectors and their associated labels. A training vector is a vector with a set of known labels. An individual similarity value is calculated between input vector 102 and a respective training vector.

Note that, when training vector set 103 contains a large of training vectors, training data sampling module 105 can be used to select a subset of the entire set of training vectors 103, such that the selected subset contains a smaller number of training vectors and still represents a sufficient number of associated labels.

After the similarity values are computed, the known labels associated with a training vector are assigned the corresponding similarity value. In other words, a particular label would receive a number of similarity values, each of which is calculated based on input vector 102 and a training vector to which this label is associated. Subsequently, for each label, label ranking module 106 aggregates all the corresponding assigned similarity values, and normalize these values. Next, label ranking module 106 ranks all the labels based on their aggregated and normalized similarity values. Labels that are ranked above a predetermined threshold are identified as output labels 108 and associated with input vector 102. Note that the system can optionally include a label size prediction module 107, which can predict the number of labels associated with input vector 102 based on the similarity values.

Figure 2:
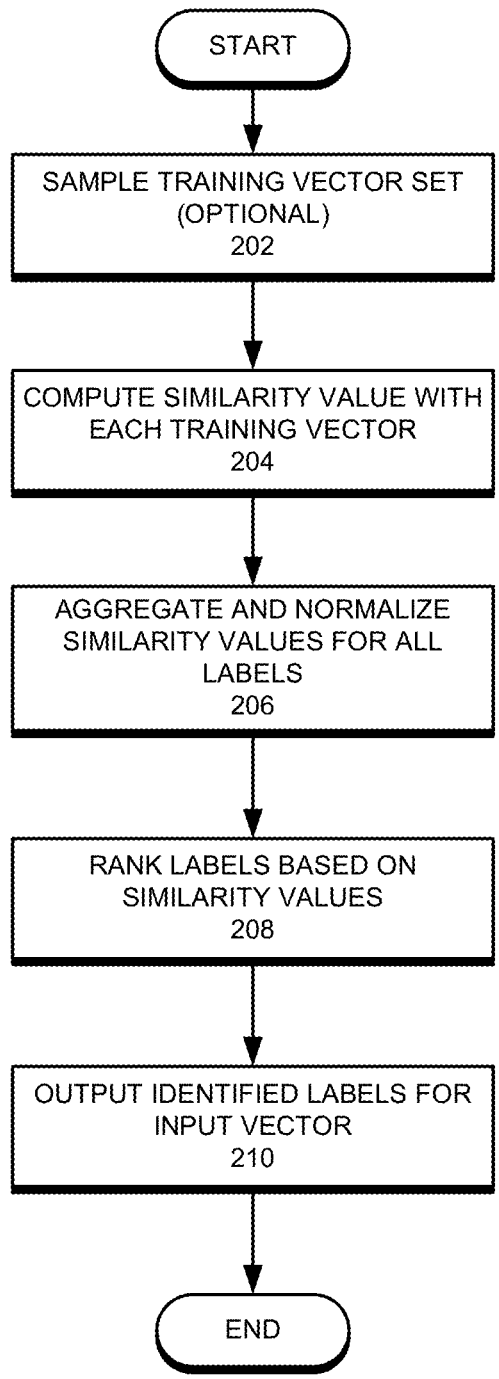
FIG. 2 illustrates an exemplary process of similarity-based multi-label classification, in accordance with an embodiment of the present invention.

FIG. 2 illustrates an exemplary process of similarity-based multi-label classification, in accordance with an embodiment of the present invention. During operation, the system can first optionally sample the training vector set (step 202). The system can then compute a similarity value between the input vector and every training vector (step 204). Next, the system aggregates and normalizes the similarity values for all the labels (step 206), and ranks all the labels based on their aggregated and normalized similarity values (step 208). The system then outputs the labels that are ranked above a predetermined threshold as the identified labels associated with the input vector.

Figure 3:
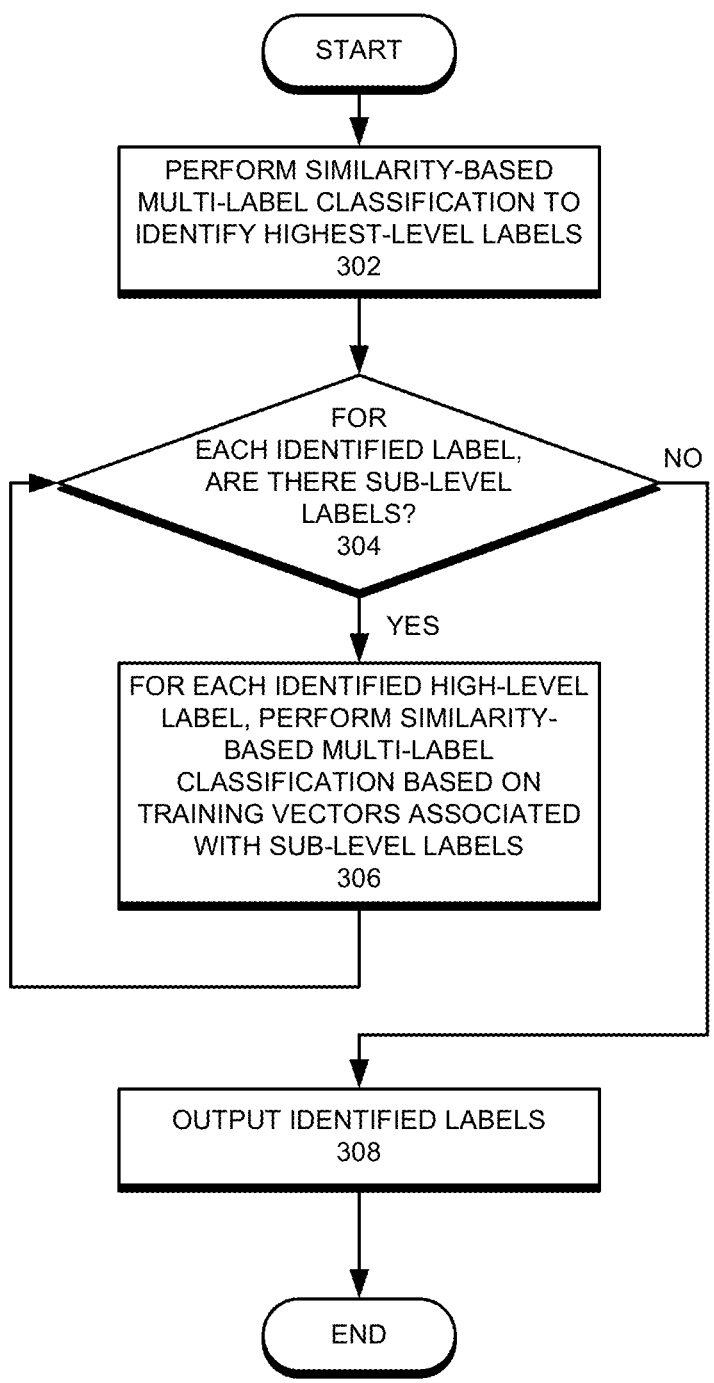
FIG. 3 illustrates an exemplary process of similarity-based hierarchical multi-label classification, in accordance with an embodiment of the present invention.

In some embodiments, the SML system can also be used for performing hierarchical multi-label classification. FIG. 3 illustrates an exemplary process of similarity-based hierarchical multi-label classification, in accordance with an embodiment of the present invention. During operation, the system first performs similarity-based multi-label classification with respect to the highest-level labels (step 302). The system then determines for each identified highest-level label whether there are any sub-level labels (step 304). If so, for each identified high-level label, the system then iteratively performs similarity-based multi-label classification to identify the associated labels (step 306), and reverts back to step 304 to process further lower-level labels. If there are no more sub-level labels, the system then outputs all the identified labels from different levels (step 308). The above process is performed recursively until all the label levels are exhausted.

A detailed description of SML is provided as follows.

Let $\chi = \mathbb{R}^M$ denote the input space and let $\mathcal{Y} = \{1, 2, \ldots, K\}$ denote the set of possible class labels. Given a multi-label training set $\mathcal{D}$ defined as:

$$\mathcal{D} = \{(x_1, Y_1), \ldots, (x_N, Y_N)\} \quad (1)$$

where $x_i \in \chi$ is a M-dimensional training vector representing a single instance and $Y_i$ is the label set associated with $x_i$. Given $\mathcal{D}$, the goal of the multi-label learning problem is to learn a function h: $\chi \to 2^K$ which predicts a set of labels for an unseen instance $x_j \in \mathbb{R}^M$. A multi-label learning algorithm typically outputs a real-valued function $f: \chi \times \mathcal{Y} \to \mathbb{R}$ where $f_k(x_i)$ is the confidence of label $k \in \mathcal{Y}$ for the unseen test instance $x_i$. Given an instance $x_i$ and its associated label set $Y_i$, a good multi-label learning algorithm will output larger values for labels in $Y_i$ and smaller values for labels not in $Y_i$. In one embodiment, the value of this confidence has a range between 0 and 1.

A variety of evaluation criterion can be considered for comparing multi-label learning methods. The multi-label hamming loss is the fraction of incorrectly classified instance-label pairs:

$$E_D(f) = \frac{1}{N} \sum_{i=1}^{N} \frac{1}{K} |h(x_i) \Delta Y_i| \quad (2)$$

where $\Delta$ is the symmetric difference between the predicted label set $\hat{Y}_i = h(x_i)$ and the actual ground truth label set $Y_i$. A misclassified instance-label pair corresponds to either not predicting an actual label of $x_i$ or incorrectly predicting an irrelevant label for $x_i$. One-error evaluates how many times the top-ranked label is not in the set of ground truth (held-out) labels:

$$E_D(f) = \frac{1}{N} \sum_{i=1}^{N} \mathbb{I}[[\operatorname{argmax}_{k \in Y} f_k(x_i)] \notin Y_i] \quad (3)$$

where for any predicate p the indicator function $\mathbb{I}[p]=1$ iff p holds and 0 otherwise. Perfect performance is achieved when $E_D(f)=0$. Given a set of labels ordered from most likely to least, coverage measures the max position in the ordered list such that all proper labels are recovered:

$$E_D(f) = \frac{1}{N} \sum_{i=1}^{N} \max_{k \in Y_i} \pi(x_i, k) - 1 \quad (4)$$

where $\pi(x_i, k)$ is the rank of label $k \in Y_i$ when the real-valued function values $f_1(x_i), f_2(x_i), K, f_K(x)$ representing label confidence scores are sorted in descending order (largest to smallest). Ranking loss measures the fraction of reversely ordered label pairs:

$$E_D(f) = \frac{1}{N} \sum_{i=1}^{N} \frac{1}{|Y_i||\overline{Y}_i|} |\{(k, k') \in Y_i \times \overline{Y}_i | f_k(x_i) \le f_{k'}(x_i)\}| \quad (5)$$

Average precision measures the average fraction of relevant labels ranked higher than a particular label $k \in Y_i$:

$$E_D(f) = \frac{1}{N} \sum_{i=1}^{N} \frac{1}{|Y_i|} \sum_{k \in Y_i} \frac{|\{k' \in Y_i | \pi(x_i, k') \le \pi(x_i, k)\}|}{\pi(x_i, k)} \quad (6)$$

Multi-label learning methods ideally should have high precision (Eq. 6) with low hamming loss (Eq. 2), one-error (Eq. 3), coverage (Eq. 4), and ranking loss (Eq. 5).

The following section describes the class of similarity-based multi-label learning methods called SML.

Given a multi-label training set $$D = \{(x_1, Y_1), K, (x_j, Y_j), \ldots, (x_N, Y_N)\}$$

where $x_j \in R^M$ is a M-dimensional training vector representing a single instance and $Y_j$ is the label set associated with $x_j$, the goal of multi-label classification is to predict the label set $Y_i$ of an unseen instance $x_i \in R^M$. In this disclosure, we normalize $x_i$ as $Px_i$ $P = \sqrt{\langle x_i, x_i \rangle}$ where $\langle x_i, x_i \rangle$ is the inner product and $Px_i P$ is the magnitude of $x_i$, thus the normalized vector is $x_i / ||x_i||$. However, SML works well for other norms which can be selected depending on the application. Given the subset $D_k \subseteq D$ of training instances with label $k \in \{1, 2, K, K\}$ defined as $$D_k = \{(x_i, Y_i) \in D | k \in Y_i\} \quad (7)$$

we estimate the weight $f_k(x_i)$ of label k for an unseen test instance $x_i \in R^M$ as:

$$f_k(x_i) = \sum_{x_j \in D_k} \Phi \langle x_i, x_j \rangle \quad (8)$$

where $\Phi$ denotes predetermined similarity function. Notably, the proposed family of similarity-based multi-label learning algorithms can leverage any similarity function $\Phi$. Furthermore, our approach does not require mappings in high-dimensional Hilbert spaces as required by Rank-SVM. We define a few parameterized similarity functions below. Given M-dimensional vectors $x_i$ and $x_j$, the radial-basis function (RBF) similarity function is:

$$\Phi(x_i, x_j) = \exp[-\gamma P x_i - x_j P^2] \quad (9)$$

A common class of similarity measures for vectors of uniform length are polynomial functions:

$$\Phi(x_i, x_j) = [\langle x_i, x_j \rangle + c]^d \quad (10)$$

where $\langle \cdot, \cdot \rangle$ is the inner product of two vectors, d is the degree of the polynomial, and c is a regularization term trading off higher-order terms for lower-order ones in the polynomial. Linear-SML and quadratic-SML are special cases of Eq. (10) where d=1 and d=2, respectively. Polynomial kernels are important for NLP and other applications. Furthermore, all label weights denoted by $f(x_i)$ for test instance $x_i$ are estimated as:

$$f(x_i) = \begin{bmatrix} f_1(x_i) \\ M \\ f_K(x_i) \end{bmatrix} = \begin{bmatrix} \sum_{x_j \in 1} \Phi \langle x_i, x_j \rangle \\ M \\ \sum_{x_j \in K} \Phi \langle x_i, x_j \rangle \end{bmatrix} \quad (11)$$

The approach is summarized in Table 1 below.

TABLE 1

| | |
|---|---|
| 1 | procedure SML(a set of training instances $D = \{(x_1, Y_1), \ldots, (x_N, Y_N)\}$, an unseen test insurance $x_i$, a similarity function $\Phi$ with hyperparameter $\gamma$) |
| 2 | Normalize the unseen test instance $x_i \leftarrow g(x_i)$ |
| 3 | $p \leftarrow [0 \ldots 0] \in \mathbb{R}^K$      ▷ also denoted by $f(x_i)$ |
| 4 | parallel for each $(x_j, y_j) \in D$ do |
| 5 |    $S_{ij} = \Phi \langle x_i, x_j \rangle$ |
| 6 |    for each $k \in Y_j$ do |
| 7 |      $p_k = p_k + S_{ij}$ |
| 8 |    end for |
| 9 | end parallel |
| 10 | Predict label set $\hat{Y}_i$ using Eq. 13 (or by solving Eq. 16 and using t to predict $\hat{Y}_i$) |
| 11 | return label confidences $p \in \mathbb{R}^K$ and label set $\hat{Y}_i$. |

After estimating $f(x_i) = [f_1(x_i) L f_K(x_i)]^T \in R^K$ via Eq. 11, we predict the label set $Y_i$ of $x_i$; see the section below for further details. As an aside, binary and multi-class problems are special cases of the proposed family of similarity-based multi-label learning approaches. Furthermore, the binary and multi-class algorithms are recovered as special cases of SML when $|Y_i|=1$, for $1 \le i \le N$. Indeed, the proposed similarity-based multi-label learning approach expresses a family of algorithms as many components are interchangeable such as the similarity function $\Phi$, normalization, and the sampling or sketching approach to reduce the training data. The expressiveness and flexibility of SML enables it to be easily adapted for application-specific tasks and domains. In addition, SML lends itself to an efficient parallel implementation.

Embodiments of the present invention further provide a similarity-based approach for predicting the label set size. For each label set $Y_i$ corresponding to a training instance $x_i$ in the training set D, we set its label to $|Y_i|$, i.e., the number of labels associated with $x_i$. Let $=[y_1 \ y_2 \ L \ y_N] \in R^N$ denote an N-dimensional label vector, where each $y_i = |Y_i|$ is the new transformed cardinality label of $x_i$ in D. The new label vector $y \in R^N$ is used to predict the label set size. In particular, the new training data is:

$$D' = \{(x_i, y_i)\}, \text{ for } i=1, 2, K, N$$

where the label set $Y_i$ of each instance is replaced by its transformed label $y_i$ that encodes the label set size $|Y_i|$ of $x_i$. Furthermore, let $Y' = \{|Y_i|\}_{i=1}^{N}$ denote the label space given by the transformation and $K' = |Y'|$ denote the number of unique labels (i.e., label set cardinalities). The above process transforms the original multi-label classification problem into a general multi-class problem for predicting the label set size.

Given $D' = \{(x_1, y_1), K, (x_N, y_N)\}$, the label set size of an unseen instance $x_i$ is predicted as follows. First, the similarity of $x_i$ with respect to each training instance $(x_j, y_j) \in D'$ is derived as $\Phi(x_i, y_j)$, $1 \le j \le N$ and the similarities from training instances with the same set size (label) $k \in Y'$ are combined via addition. More formally, the similarity of instances in D' of the same set size (class label) k∈Y' with respect to $x_i$ is:

$$f(x_i) = \sum_{x_j \in D'_k} \Phi\langle x_i, x_j \rangle \quad (12)$$

where $D'_k \subseteq D'$ is the subset of training instances with label k∈Y'. Therefore, we predict the set size of $x_i$ using the following decision function:

$$\xi(x_i) = \underset{k \in Y'}{\mathrm{argmax}} \sum_{x_j \in D'_k} \Phi\langle x_i, x_j \rangle \quad (13)$$

where $\xi(\cdot)$ is the predicted label set size for $x_i$. $\xi(x_i)$ is the label set size with maximum similarity. Given the label set size $\xi(x_i)$, we predict the label set $\hat{Y}_i$ of $x_i$ by ordering the labels from largest to smallest weight based on $f_1(x_i)$, $f_2(x_i)$, ..., $f_K(x_i)$ and setting $\hat{Y}_i$ to the top $\xi(x_i)$ labels with the largest weight. We also define a stronger decision function that requires a test instance $x_i$ be more similar to class k than it is to the combined weight of all other classes:

$$\xi(x_i) = \underset{k \in Y'}{\mathrm{argmax}} f_k(x_i) > \sum_{c \neq k} f_c(x_i) \quad (14)$$

Notice that Eq. 13 and Eq. 14 essentially solve regression problems using a multi-class variant of the proposed similarity-based approach.

Alternatively, we can infer the label set of $x_i$ by learning a threshold function t:X→R such that:

$$h(x) = \{k | f_k(x) > t(x), k \in Y\} \quad (15)$$

where $f_k(x)$ is the confidence of label k∈Y for the unseen test instance x. To learn the threshold function t(·), we assume a linear model t(x)=⟨x, f(x)⟩+b. More formally, we solve the following problem based on the training set D:

$$\underset{w,b}{\mathrm{minimize}} \sum_{i=1}^{N} [\langle w, f(x_i) \rangle + b - s(x_i)]^2 \quad (16)$$

In Eq. 16, we set $s(x_i)$ as:

$$s(x_i) = \underset{\tau \in R}{\mathrm{argmin}} |\{k \in Y_i \text{ s.t. } f_k(x_i) \leq \tau\}| + |\{q \in \overline{Y}_i \text{ s.t. } f_q(i) \geq \tau\}| \quad (17)$$

where $\overline{Y}_i$ is the complement of $Y_i$. After learning the threshold function t(·), we use it to predict the label set $Y_i$ for the unseen instance $x_i$. Nevertheless, any approach that predicts the label set $Y_i$ from the learned weights $f_1(x_i)$, K, $f_K(x_i)$ can be used by SML.

SML is both time and space-efficient for large data and naturally amenable to streaming data and online learning. Given a single test instance x, the runtime of SML is O(NM $\overline{K}$) where N is the number of training instances, M is the number of attributes, and $$\overline{K} = \frac{1}{N} \sum_{i=1}^{N} |Y_i|$$

is the average number of labels per training instance. SML derives the similarity between each training instance's M-dimensional attribute vector. The space complexity of SML for a single test instance x is O(K) where K is the number of labels. This does not into account the space required by SML and other methods to store the training instances and the associated label sets. For the similarity-based set size prediction approach, the time complexity is only O(NM) since the label set size with maximum similarity can be maintained in o(1) time. However, the approach uses O(K') space where K'≤K.

Note that if the M-dimensional feature vectors $\{x_1, x_2, K, x_i, K\}$ are sparse (i.e., $|\Omega(x_i)|=M$ where $\Omega(x_i)$ denotes the nonzero indices of $x_i$) then $\Phi(x_i, z_j)$, for 1≤i≤N is solved efficiently by hashing the values of the unseen test instance $x_j$ via a perfect hash function and then using this to efficiently test the similarity between only the nonzero elements of $x_i$. Thus, it takes $O(|\Omega(x_j)|)$ time to create the hash table for the unseen test instance $x_j$ which is only performed once (in the outer loop) and then for each of the nonzero values in the training instance $x_i$ we obtain from $x_j$ the corresponding test instance feature value in only o(1) time. This gives a total time complexity of $O(|\Omega(x_j)|+|\Omega(x_i)|)$. However, since the hash table is only computed once (in the outer loop) for all N training instances this cost becomes neglible. Therefore, evaluating $\Phi(x_i, z_j)$, for 1≤i≤N takes only $O(|\Omega(x_j)|+N|\Omega(x_i)|) = O(N|\Omega(x_i)|)$. In terms of space, it takes O(M) space to store the hash table, O(K) to store the estimated similarity weights for the test instance $_j$ and $O(2|\Omega(x_j)|+2|\Omega(x_i)|)$ to store the sparse test and train instance. The labels of each instance can be stored as sets with no additional data structures required.

Now we describe a group-based centroid sketching approach for multi-label learning algorithms. The goal of the approach is to reduce the computational complexity of a multi-label classification method while maintaining a similar classification performance (high accuracy, low error). The sketching method takes significantly less time than solving the multi-label learning problem directly using all available training data. Therefore, in general, a sketching method is fast taking sub-linear or linear time at most.

There are two general approaches. The first general approach to computing a sketch is based on a sampling mechanism (or distribution) F (i.e., the distribution F may be a weighted or uniform distribution). These sampling-based methods compute a sketch $D_s \subseteq D$ of the training data where $D_s$ is a small but representative sample of the original training set D such that N? $N_s$ where N=|D| and $N_s=|D_s|$. For instance, in the case of a uniform distribution we have the following:

$$D_s = \{(x_i, Y_i) \in |i: \mathrm{UniformDiscrete}\{1,2,K,N\}\}_{j=1}^{N_s},$$

The second type of approach is based on generating new training instances from the initial training data. These generative-based methods compute a sketch that represents a new training set $D_s \not\subseteq D$ where $(x^*_i, Y_i) \not\in D$, for 1≤i≤$N_s$ such that $N_s = N$. The goal is to derive or learn (in an unsupervised fashion) new training instances that summarize the original training data while improving the power of generalization. It is possible for a multi-label learning approach using the set of new training vectors to outperform the same approach using the original training data, e.g., if the new training vectors generalize better. In this work, we focus primarily on the second type and propose a generative-based sketching method for multi-label problems. We describe the group-based centroid sketching approach below.

The first step is to derive $Y^* = \{Y^*_1, Y^*_2, K, Y^*_L\}$ consisting of all the unique label sets from the training data D. In addition, let $X^* = \{X^*_1, X^*_2, K, X^*_L\}$ denote the sets of training vectors associated with the L label sets in $Y^*$ where $X^*_k \in X^*$ is a matrix containing the training vectors associated with the label set $Y^*_k \in Y^*$. For each $X^*_k \in X^*$ where $X^*_k$ is an $N_k \times M$ matrix:

$$X^*_k = [L \ x_i L]^T \quad (18)$$

we derive a C×M matrix $C_k[L \ c_i L]$ of "iterative centroids" where $C \leq N_k$ by solving:

$$\underset{S}{\operatorname{argmin}} \sum_{i=1}^{C} \sum_{x \in S_j} Px - c_i P^2 \quad (19)$$

where the $N_k$ training vectors in $X^*_k$ associated with the label set $Y^*_k$ are partitioned into $C \leq N_k$ sets $S = \{S_1, K, S_C\}$. Notice that k-means is used to derive C "iterative centroids" (Equation 19). However, any approach that derives a compact summarization of the data can be used. Next, each iterative centroid vector $c_i$ in $C_k$ is assigned the label set $Y^*_k$ (which can also be defined as a binary vector $y^*_k \in \{0,1\}^K$). Finally, we use the centroids $C_1, C_2, K, C_L$ along with the associated label sets $Y^*_1, Y^*_2, K, Y^*_L$ as input into a multi-label learning method such as SML. If $C = N_k$ then we recover the actual training vectors $[L \ x_i L]$ as the centroids. Furthermore, if C=1 then the new training vector is the centroid (mean vector) of the $N_k \times M$ matrix $X^*_k$.

In the following section, we investigate SML for multi-label classification on a number of multi-label problems from different domains using a range of evaluation criterion. We compare the performance of SML against a variety of multi-label methods including:

ML-KNN: A kNN-based multi-label approach that uses Euclidean distance to find the top-k instances that are closest in the N-dimensional euclidean space. ML-KNN was shown to perform well for a variety of multi-label problems.

BoosTexter: A boosting-based multi-label method called BoosTexter.

ADTBOOST.MH: An indirect multi-label approach that uses decision trees.

Rank-SVM: An indirect multi-label SVM approach based on ranking.

For BoosTexter and ADTBOOST.MH we use 500 and 50 boosting rounds respectively since performance did not change with more rounds. For Rank-SVM we use polynomial kernels with degree 8 which have been shown to perform best. Unless otherwise mentioned, our approach uses the RBF similarity function in Eq. (9); the RBF hyperparameter is learned automatically via k-fold cross-validation on 10% of the labeled data. All multi-label learning algorithms are evaluated using a wide variety of evaluation criterion including hamming loss, one error, coverage, ranking loss, and average precision. Multi-label learning methods should have high precision with low hamming loss, one-error, coverage, ranking loss.

Gene Functional Classification:

The first multi-label learning task we evaluate is based on predicting the functions of genes from Yeast *Saccharomyces cerevisiae*—a widely studied organism in bioinformatics. Each gene may take on multiple functional classes. Each gene consists of a concatenation of micro-array expression data and phylogenetic profile data. We preprocess the data such that only the known structure of the functional classes are used. This corresponds to using only the functional classes in the top hierarchy. The resulting multi-label yeast data consists of N=2417 genes where each gene is represented by a (M=103)-dimensional feature vector. There are K=14 functional classes (labels).

We use 10-fold cross-validation and show the mean and standard deviation. Experimental results for SML and other multi-label learning methods are reported in Table 2. Notably, all multi-label methods are compared across a wide range of evaluation metrics. The best result for each evaluation criterion is shown in bold. In all cases, SML outperforms all other multi-label learning methods across all 5 evaluation criteria. Furthermore, the variance of SML is also smaller than the variance of other multi-label learning methods in most cases. This holds across all multi-label learning methods for coverage, average precision, and ranking loss.

TABLE 2

EXPERIMENTAL RESULTS FOR EACH MULTI-LABEL LEARNING ALGORITHM ON THE YEAST DATA (MEAN ± STD).

| Evaluation criterion | | SML | ML-KNN [23] | BOOSTEXTER [8] | ADTBOOST.MH [24] | RANK-SVM [9] |
|---|---|---|---|---|---|---|
| Hamming loss | (↓) | 0.193 ± 0.013 | 0.194 ± 0.010 | 0.220 ± 0.011 | 0.207 ± 0.010 | 0.207 ± 0.013 |
| One-error | (↓) | 0.220 ± 0.021 | 0.230 ± 0.030 | 0.278 ± 0.034 | 0.244 ± 0.035 | 0.243 ± 0.039 |
| Coverage | (↓) | 6.082 ± 0.184 | 6.275 ± 0.240 | 6.550 ± 0.243 | 6.390 ± 0.203 | 7.090 ± 0.503 |
| Ranking loss | (↓) | 0.155 ± 0.011 | 0.167 ± 0.016 | 0.186 ± 0.015 | N/A | 0.195 ± 0.021 |
| Average precision | (↑) | 0.783 ± 0.016 | 0.765 ± 0.021 | 0.737 ± 0.022 | 0.744 ± 0.025 | 0.749 ± 0.026 |

Experimental results comparing the various sketch approaches as the fraction of train instances varies. Note the number of centroids learned by our approach depends on the number of training vectors associated with a given set of labels.

To better understand the relative predictive performance between the multi-label classification methods, we define a partial order f between the methods for each evaluation metric where $A_1 \, f \, A_2$ implies that method $A_1$ is better than $A_2$ for a given evaluation criterion (e.g., ranking loss). Table 3 summarizes the partial order between all the multi-label learning methods in terms of each evaluation metric.

TABLE 3

RELATIVE PERFORMANCE COMPARISON OF THE MULTI-LABEL LEARNING ALGORITHMS ON THE YEAST DATA.

| Evaluation criterion | | $A_1$ = SML | $A_2$ = ML-KNN | $A_3$ = BOOSTEXTER | $A_4$ = ADTBOOST.MH | $A_5$ = RANK-SVM |
|---|---|---|---|---|---|---|
| Hamming loss | ($\downarrow$) | $A_1 > A_3$, | $A_1 > A_4$, | $A_1 > A_5, A_2 > A_3$, | $A_2 > A_4, A_2 > A_5$, | $A_4 > A_3, A_5 > A_3$ |
| One-error | ($\downarrow$) | $A_1 > A_3$, | $A_1 > A_4$, | $A_1 > A_5, A_2 > A_3$, | $A_4 > A_3, A_5 > A_3$ | |
| Coverage | ($\downarrow$) | $A_1 > A_2$, | $A_1 > A_3$, | $A_1 > A_4, A_1 > A_5$ | | |
| | | $A_2 > A_3$, | $A_2 > A_1$, | $A_2 > A_5, A_3 > A_5$, | $A_4 > A_3, A_4 > A_5$ | |
| Ranking loss | ($\downarrow$) | $A_1 > A_2$, | $A_1 > A_3$, | $A_1 > A_5, A_2 > A_3$, | $A_2 > A_5$ | |
| Average precision | ($\uparrow$) | $A_1 > A_2$, | $A_1 > A_3$, | $A_1 > A_4, A_1 > A_5$, | $A_2 > A_3, A_2 > A_4$ | |
| Total order (Eq. 20) | | SML(17) > | ML-KNN(8) > | ADTBOOST.MH(−3) > | RANK-SVM(8) > | BOOSTEXTER(−14) |

The partial order f measures the relative performance between two methods for a specific evaluation criterion, but does not measure the overall superiority of a method over all methods and evaluation criterion (Equations 2-6). Therefore, we derive a score for each algorithm which allows us to compare the overall superiority of a method over another across all evaluation criteria. For this we use the scoring scheme from I. Zliobaite, A. Bifet, B. Pfahringer, and G. Holmes, "Active learning with drifting streaming data," *TNNLS*, vol. 25, no. 1, pp:27-39, 2014. Given a method $A_i$, we measure the overall superiority of $A_i$ over all the other methods $A_j \in A$ and across all evaluation criteria $E = \{E_1, K, E_p\}$ as follows:

$$\Gamma(A_i) = \sum_{E_k \in E} \sum_{\substack{A_j \in A \\ i \neq j}} \Delta(A_i, A_j P E_k) \tag{20}$$

where $$\Delta(A_i, A_j P E_k) = \begin{cases} 1 & \text{if} A_i \, f \, A_j \text{holds} \\ -1 & \text{if} A_j \, f \, A_i \text{holds} \\ 0 & \text{otherwise} \end{cases} \tag{21}$$

From Equation 20 it is possible to derive a total order on the set of all multi-label learning methods A. The total order along with the score $\Gamma(A_i)$ of each method $A_i \in A$ are provided in the last row of Table 3.

Overall, SML significantly outperforms all other multi-label learning methods across all evaluation criteria as summarized by the total order (and scores derived from Equation 20) reported in Table 3. The scores shown in parentheses summarize the number of times a method outperforms another or vice-versa. Particularly, the difference in score between SML and the next best multi-label learning method ML-LNN is large.

Scene Classification:

The second multi-label learning task we evaluate SML for is natural scene classification using image data. In scene classification each image may be assigned multiple labels representing different natural scenes such as an image labeled as a mountain and sunset scene. Therefore, given an unseen image the task is to predict the set of scenes (labels) present in it. The scene data consists of 2000 images where each image contains a set of manually assigned labels. There are K=5 labels, namely, desert, mountains, sea, sunset, and trees. Each image is represented by a 294-dimensional feature vector derived using the approach in G. Carneiro, A. B. Chan, P. J. Moreno, and N. Vasconcelos, "Supervised learning of semantic classes for image annotation and retrieval," TPAMI, vol. 29, no. 3, pp. 394-410, 2007.

We use 10-fold cross-validation and show the mean and standard deviation. The experimental results of SML and the other multi-label algorithms using the natural scene classification data are reported in Table 4. The best result for each evaluation criterion is in bold. From Table 4, it can be seen that SML outperforms all other multi-label learning methods on all but one evaluation criterion, namely, coverage. In terms of coverage ML-KNN and BoosTexter are tied and have slightly lower coverage than SML.

The relative performance between the methods for scene classification is shown in Table 5 and is similar to the relative performance observed using the yeast data for gene functional classification. The main difference is that BoosTexter outperforms ADTBOOST.MH and Rank-SVM. In particular, the total order given by Eq. 20 is SML(15)>ML-KNN(7)>BoosTexter(5)>ADTBOOST.MH(−8)>Rank-SVM(−19). However, it is straightforward to derive the partial order "f" and total order ">" from Table 4 using Equation 20. Overall, it is clear from Table 5 that SML is superior to all multi-label learning methods in terms of all evaluation criterion.

TABLE 4

RESULTS OF THE MULTI-LABEL LEARNING ALGORITHMS FOR NATURAL SCENE CLASSIFICATION (MEAN ± STD).

| Evaluation criterion | | SML | ML-KNN [23] | BOOSTEXTER [8] | ADTBOOST.MH [24] | RANK-SVM [9] |
|---|---|---|---|---|---|---|
| Hamming loss | ($\downarrow$) | 0.140 ± 0.009 | 0.169 ± 0.016 | 0.179 ± 0.015 | 0.193 ± 0.014 | 0.253 ± 0.055 |
| One-error | ($\downarrow$) | 0.252 ± 0.026 | 0.300 ± 0.046 | 0.311 ± 0.041 | 0.375 ± 0.049 | 0.491 ± 0.135 |
| Coverage | ($\downarrow$) | 0.984 ± 0.112 | 0.939 ± 0.100 | 0.939 ± 0.092 | 1.102 ± 0.111 | 1.382 ± 0.381 |
| Ranking loss | ($\downarrow$) | 0.164 ± 0.020 | 0.168 ± 0.024 | 0.168 ± 0.020 | N/A | 0.278 ± 0.096 |
| Average precision | ($\uparrow$) | 0.852 ± 0.016 | 0.803 ± 0.027 | 0.798 ± 0.024 | 0.755 ± 0.027 | 0.682 ± 0.093 |

TABLE 5

PERFORMANCE COMPARISON OF THE MULTI-LABEL LEARNING ALGORITHMS FOR SCENE CLASSIFICATION.

| Evaluation criterion | | $A_1$ = SML | $A_2$ = ML-KNN | $A_3$ = BOOSTEXTER | $A_4$ = ADTBOOST.MH | $A_5$ = RANK-SVM |
|---|---|---|---|---|---|---|
| Hamming loss | ($\downarrow$) | $A_1 > A_2$, $A_3 > A_4$, | $A_1 > A_3$, $A_3 > A_5$, | $A_1 > A_4$, $A_1 > A_5$, $A_4 > A_5$ | $A_2 > A_3$, $A_2 > A_4$, | $A_2 > A_5$, |
| One-error | ($\downarrow$) | $A_1 > A_2$, | $A_1 > A_3$, | $A_1 > A_4$, $A_1 > A_5$, | $A_2 > A_4$, $A_2 > A_5$, | $A_3 > A_4$, $A_3 > A_5$, $A_4 > A_5$ |
| Coverage | ($\downarrow$) | $A_1 > A_4$, | $A_1 > A_5$, | $A_2 > A_4$, $A_2 > A_5$, | $A_3 > A_4$, $A_3 > A_5$, | $A_4 > A_5$ |
| Ranking loss | ($\downarrow$) | $A_1 > A_5$, | $A_2 > A_5$, | $A_3 > A_5$ | | |
| Average precision | ($\uparrow$) | $A_1 > A_2$, | $A_1 > A_3$, | $A_1 > A_4$, $A_1 > A_5$, | $A_2 > A_4$, $A_2 > A_5$, | $A_3 > A_4$, $A_3 > A_5$, $A_4 > A_5$ |
| Total order (Eq. 20) | | SML(15) > | ML-KNN(7) > | BOOSTEXTER(5) > | ADTBOOST.MH(−8) > | RANK-SVM(−19) |

Web Page Categorization:

We also investigate the effectiveness of SML for text categorization using a variety of web page categorization data sets collected from the Yahoo directory where each data set represents a top-level web page category from the Yahoo directory such as *Business & Economy* and the web pages under this category are categorized further into sub-categories. Following the same experimental setup in I. Zliobaite, A. Bifet, B. Pfahringer, and G. Holmes, "Active learning with drifting streaming data," TNNLS, vol. 25, no. 1, pp. 27-39, 2014, we reduce the dimensionality of the feature vectors by selecting only the top 2% most frequent words used among the collection of web pages (documents). After selecting the terms, each web page (document) is represented by an M-dimensional feature vector where each feature value represents the frequency of a given word on a particular page.

Experimental results are reported in Tables 6-7. The best result for each evaluation criterion is in bold. SML outperforms the other methods over all web category data sets in terms of one-error, coverage, ranking loss, and average precision. In terms of hamming loss, there are a few web categories where other methods perform better than SML. The total order (indicating the superiority of a multi-label learning method over another) is SML>{ML-KNN, BoosTexter}>ADTBOOST.MH>Rank-SVM. Overall, SML is clearly superior to the other multi-label learning methods in terms of all evaluation criteria. This data differs fundamentally from the others in two main ways. First, the features are extremely sparse. Second, there are thousands of features as opposed to tens or hundreds of features. Therefore, we implemented a variant of SML that leverages specialized sparse data structures. This provided a significant improvement in performance (between 6-14 times faster) for such sparse data with the above characteristics.

TABLE 6

EXPERIMENTAL RESULTS WEB CATEGORIZATION.

|  | SML | ML-KNN [23] | BOOSTEXTER [8] | ADTBOOST.MH [24] | RANK-SVM [9] |
|---|---|---|---|---|---|
| Ham. loss (Eq. 2) ↓ | | | | | |
| Arts & Humanities | 0.0610 | 0.0612 | 0.0652 | 0.0585 | 0.0615 |
| Business & Economy | 0.0267 | 0.0269 | 0.0293 | 0.0279 | 0.0275 |
| Computers & Internet | 0.0382 | 0.0412 | 0.0408 | 0.0396 | 0.0392 |
| Education | 0.0393 | 0.0387 | 0.0457 | 0.0423 | 0.0398 |
| Entertainment | 0.0572 | 0.0604 | 0.0626 | 0.0578 | 0.0630 |
| Health | 0.0369 | 0.0458 | 0.0397 | 0.0397 | 0.0423 |
| Recreation & Sports | 0.0602 | 0.0620 | 0.0657 | 0.0584 | 0.0605 |
| Reference | 0.0294 | 0.0314 | 0.0304 | 0.0293 | 0.0300 |
| Science | 0.0322 | 0.0325 | 0.0379 | 0.0344 | 0.0340 |
| Social & Science | 0.0228 | 0.0218 | 0.0243 | 0.0234 | 0.0242 |
| Society & culture | 0.0537 | 0.0537 | 0.0628 | 0.0575 | 0.0555 |
| One-error (Eq. 3) ↓ | | | | | |
| Arts & Humanities | 0.4988 | 0.6330 | 0.5550 | 0.5617 | 0.6653 |
| Business & Economy | 0.1001 | 0.1213 | 0.1307 | 0.1337 | 0.1237 |
| Computers & Internet | 0.3694 | 0.4357 | 0.4287 | 0.4613 | 0.4037 |
| Education | 0.4642 | 0.5207 | 0.5587 | 0.5753 | 0.4937 |
| Entertainment | 0.4180 | 0.5300 | 0.4750 | 0.4940 | 0.4933 |
| Health | 0.3090 | 0.4190 | 0.3210 | 0.3470 | 0.3323 |
| Recreation & Sports | 0.4501 | 0.7057 | 0.5557 | 0.5547 | 0.5627 |
| Reference | 0.3957 | 0.4730 | 0.4427 | 0.4840 | 0.4323 |
| Science | 0.4951 | 0.5810 | 0.6100 | 0.6170 | 0.5523 |
| Social & Science | 0.3260 | 0.3270 | 0.3437 | 0.3600 | 0.3550 |
| Society & culture | 0.4040 | 0.4357 | 0.4877 | 0.4845 | 0.4270 |
| Coverage (Eq. 4) ↓ | | | | | |
| Arts & Humanities | 4.5893 | 5.4313 | 5.2973 | 5.1900 | 9.2723 |
| Business & Economy | 1.8047 | 2.1840 | 2.4123 | 2.4730 | 3.3637 |
| Computers & Internet | 3.2183 | 4.4117 | 4.4887 | 4.4747 | 8.7910 |
| Education | 3.1180 | 3.4973 | 4.0673 | 3.9663 | 8.9560 |
| Entertainment | 2.5320 | 3.1467 | 3.0883 | 3.0877 | 6.5210 |
| Health | 2.4831 | 3.3043 | 3.0780 | 3.0843 | 5.5400 |
| Recreation & Sports | 3.3320 | 5.1010 | 4.4737 | 4.3380 | 5.6680 |
| Reference | 2.3660 | 3.5420 | 3.2100 | 3.2643 | 6.9683 |
| Science | 4.7420 | 6.0470 | 6.6907 | 6.6027 | 12.401 |
| Social & Science | 2.5242 | 3.0340 | 3.6870 | 3.4820 | 8.2177 |
| Society & culture | 4.6080 | 5.3653 | 5.8463 | 4.9545 | 6.8837 |

TABLE 7

(CONT.) EXPERIMENTAL RESULTS FOR WEB CATEGORIZATION.

|  | SML | ML-KNN [23] | BOOSTEXTER [8] | ADTBOOST.MH [24] | RANK-SVM [9] |
|---|---|---|---|---|---|
| Ranking loss (Eq. 5) ↓ | | | | | |
| Arts & Humanities | 0.1220 | 0.1514 | 0.1458 | N/A | 0.2826 |
| Business & Economy | 0.0274 | 0.0373 | 0.0416 | N/A | 0.0662 |
| Computers & Internet | 0.0640 | 0.0921 | 0.0950 | N/A | 0.2091 |
| Education | 0.0680 | 0.0800 | 0.0938 | N/A | 0.2080 |
| Entertainment | 0.0883 | 0.1151 | 0.1132 | N/A | 0.2617 |
| Health | 0.0420 | 0.0605 | 0.0521 | N/A | 0.1096 |
| Recreation & Sports | 0.1150 | 0.1913 | 0.1599 | N/A | 0.2094 |
| Reference | 0.0583 | 0.0919 | 0.0811 | N/A | 0.1818 |
| Science | 0.0882 | 0.1167 | 0.1312 | N/A | 0.2570 |
| Social & Science | 0.0470 | 0.0561 | 0.0684 | N/A | 0.1661 |
| Society & culture | 0.1087 | 0.1338 | 0.1483 | N/A | 0.1716 |

TABLE 7-continued (CONT.) EXPERIMENTAL RESULTS FOR WEB CATEGORIZATION.

|  | SML | ML-KNN [23] | BOOSTEXTER [8] | ADTBOOST.MH [24] | RANK-SVM [9] |
|---|---|---|---|---|---|
| Avg. prec. (Eq. 6) ↑ | | | | | |
| Arts & Humanities | 0.5970 | 0.5097 | 0.5448 | 0.5526 | 0.4170 |
| Business & Economy | 0.9015 | 0.8798 | 0.8697 | 0.8702 | 0.8694 |
| Computers & Internet | 0.7040 | 0.6338 | 0.6449 | 0.6235 | 0.6123 |
| Education | 0.6430 | 0.5993 | 0.5654 | 0.5619 | 0.5702 |
| Entertainment | 0.6885 | 0.6013 | 0.6368 | 0.6221 | 0.5637 |
| Health | 0.7632 | 0.6817 | 0.7408 | 0.7257 | 0.6839 |
| Recreation & Sports | 0.6490 | 0.4552 | 0.5572 | 0.5639 | 0.5315 |
| Reference | 0.7021 | 0.6194 | 0.6578 | 0.6264 | 0.6176 |
| Science | 0.6043 | 0.5324 | 0.5006 | 0.4940 | 0.5007 |
| Social & Science | 0.7535 | 0.7481 | 0.7262 | 0.7217 | 0.6788 |
| Society & culture | 0.6502 | 0.6128 | 0.5717 | 0.5881 | 0.5717 |

Figure 4:
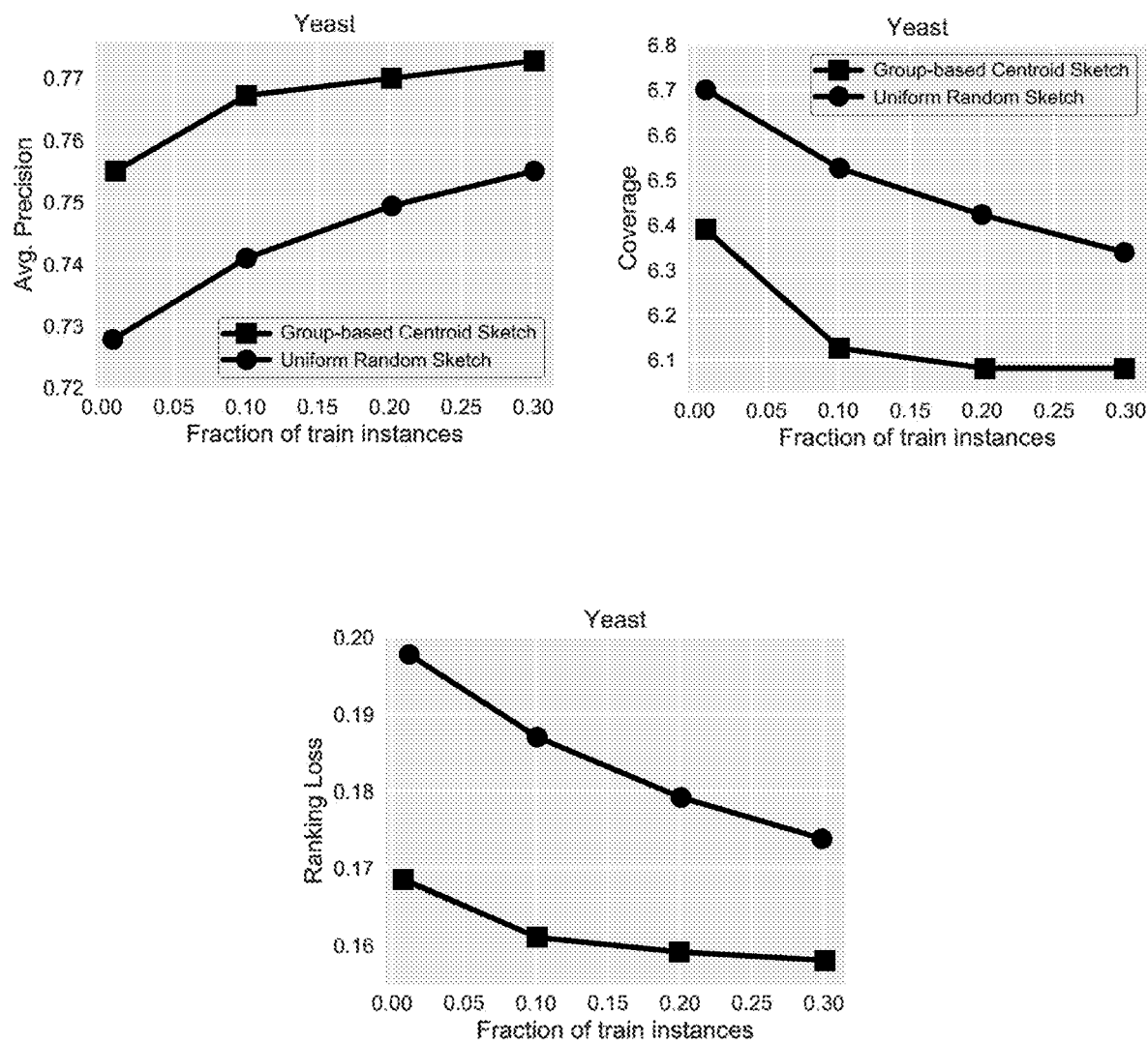
FIG. 4 presents some experimental evaluation results for an SML system, in accordance with an embodiment of the present invention.

Group-Based Centroid Sketch:

Now we evaluate the group-based centroid sketch approach. For comparison, we evaluate the approach against a uniform random sketch that samples training instances uniformly at random. Results are provided in FIG. 4. Overall, the group-based centroid approach outperforms the other approach across all fractions of training instances and evaluation criterion. Furthermore, the group-based centroid sketch has a speedup of 11× compared to SML (using the full data). For the scene classification data, we find a runtime improvement of 90× when using only C=1 centroid per unique label set. The improvement in runtime is largely determined by the number of unique label sets L relative to the total number of training instances. Notice that each unique label set is represented by at least one training example (centroid). Therefore, data sets with relatively few unique label sets (relative to the total number of training instances) will lead to a better runtime improvement than a data set with a relatively large number of unique label sets.

Figure 5:
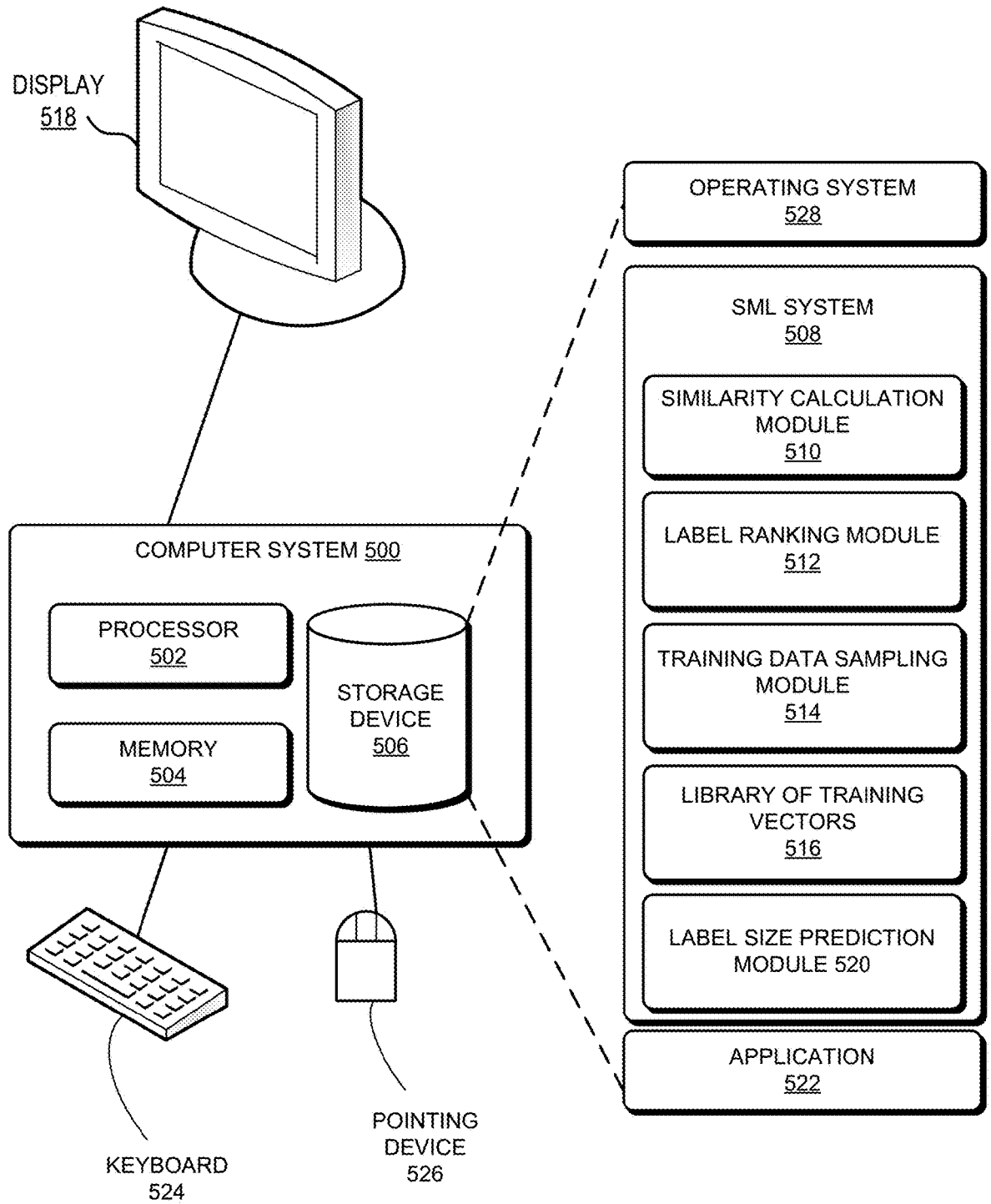
FIG. 5 illustrates an exemplary computer system that facilitates similarity-based multi-label classification, in accordance with an embodiment of the present invention.

FIG. 5 illustrates an exemplary computer system that facilitates similarity-based multi-label classification, in accordance with an embodiment of the present invention. In this example, a computer system 500 includes a processor 502, a memory device 504, and a storage device 506. Furthermore, computer system 500 can be coupled to a display device 518, a keyboard 524, and a pointing device 526. Storage device 506 can store code for an operating system 528, a similarity-based multi-label classification system 508, and application 522.

Similarity-based multi-label classification system 508 can include instructions, which when executed by processor 502 can cause computer system 500 to perform methods and/or processes described in this disclosure. Specifically, similarity-based multi-label classification system 508 can include instructions for implementing a similarity calculation module 510, a label ranking module 512, a training data sampling module 514, a library of training vectors 516, and a label size prediction module 520.

To summarize, embodiments of the present invention provide a general class of similarity-based multi-label learning methods called SML. Furthermore, embodiments of the present invention also provide a similarity-based approach for predicting the label set size. Experiments on a number of data sets demonstrate the effectiveness of SML as it compares favorably to a variety of existing methods across a wide range of evaluation criterion and multi-label problems. We also described a group-based centroid sketch for speeding up SML and other multi-label methods. Overall, the predictive performance of the group-based sketch approach has been shown to be similar to that of SML using the full training data across a range of evaluation criterion, while improving the runtime performance by an order of magnitude.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the modules described in FIG. 2 can be implemented in hardware, or a combination of hardware and software, and can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating multi-label classification for a machine learning mechanism, the method comprising:
    storing, by a computer system, a set of training vectors, wherein a respective vector represents an object, wherein a respective vector is associated with one or more feature labels that belong to a label set, and wherein a respective feature label corresponds to a feature of the object;
receiving, by the computer system, an input vector representing a human-recognizable input object, wherein the input vector is associated with a set of input labels, and wherein a respective input label corresponds to an input feature of the input object; and
classifying the input object using the machine learning mechanism, independently of supervision, on the computer system;
wherein the machine learning mechanism performs the classification based on the set of input labels by:
sampling the set of training vectors to select a subset of training vectors representative of the set of training vectors for the set of input labels, thereby reducing computational complexity for subsequent operations;
determining a similarity value between a respective input label and the subset of training vectors to generate a set of similarity values for the input label, thereby generating a plurality of sets of similarity values corresponding to the set of input labels, wherein the set of similarity values indicates a likelihood of an input feature indicated by the input label being associated with the input object;
normalizing and aggregating a respective set of similarity values of the plurality of sets of similarity values associated with a respective input label;
learning one or more input labels for the input object based on the corresponding normalized and aggregated sets of similarity values; and
recursively learning one or more sub-labels associated with a respective label of the one or more input labels, wherein learning a respective sub-label comprises determining a set of similarity values for the sub-label with respect to the subset of training vectors.

2. The method of claim 1, wherein prior to learning the input, the method further comprises associating the respective normalized and aggregated set of similarity values to a corresponding feature label in the subset of training vectors.

3. The method of claim 1, further comprising ranking a respective input label based on a corresponding normalized and aggregated set of similarity values.

4. The method of claim 1, further comprising predicting a number of features associated with the object based on the corresponding sets of similarity values.

5. The method of claim 1, wherein the one or more feature labels are organized in one or more hierarchies.

6. The method of claim 5, wherein the one or more sub-labels associated with the label are learned by performing a second round of similarity-based determination process for the label.

7. The method of claim 1, wherein the machine learning mechanism performs the classification based on the set of input labels further by learning a threshold function based on the set of training vectors; and
wherein learning the one or more input labels further comprises applying the threshold function to the corresponding set of similarity values of a respective input label.

8. A system for facilitating multi-label classification for a machine learning mechanism, the system comprising:
processing circuitry;
a non-transitory storage device coupled to the processing circuitry and storing instructions, which when executed by the processing circuitry cause the system to perform a method, the method comprising:
storing a set of training vectors, wherein a respective vector represents an object, wherein a respective vector is associated with one or more feature labels that belong to a label set, and wherein a respective feature label corresponds to a feature of the object;
receiving an input vector representing a human-recognizable input object, wherein the input vector is associated with a set of input labels, wherein a respective input label corresponds to an input feature of the input object; and
classifying the input object using the machine learning mechanism, independently of supervision,
wherein the machine learning mechanism performs the classification based on the set of input labels by:
sampling the set of training vectors to select a subset of training vectors representative of the set of training vectors for the set of input labels, thereby reducing computational complexity for subsequent operations;
determining a similarity value between a respective input label and the subset of training vectors to generate a set of similarity values for the input label, thereby generating a plurality of sets of similarity values corresponding to the set of input labels, wherein the set of similarity values indicates a likelihood of an input feature indicated by the input label being associated with the input object;
normalizing and aggregating a respective set of similarity values of the plurality of sets of similarity values associated with a respective input label;
learning one or more input labels for the input object based on the corresponding normalized and aggregated sets of similarity values; and
recursively learning one or more sub-labels associated with a respective label of the one or more input labels, wherein learning a respective sub-label comprises determining a set of similarity values for the sub-label with respect to the subset of training vectors.

9. The system of claim 8, wherein the method further comprises associating the respective normalized and aggregated set of similarity values to a corresponding feature label in the subset of training vectors.

10. The system of claim 8, wherein determining the input labels further comprises ranking a respective input label based on a corresponding normalized and aggregated set of similarity values.

11. The system of claim 8, wherein the method further comprises predicting a number of features associated with the object based on the corresponding sets of similarity values.

12. The system of claim 8, wherein the machine learning mechanism performs the classification based on the set of input labels further by learning a threshold function based on the set of training vectors; and
wherein the method further comprises learning the one or more input labels by applying the threshold function to the corresponding set of similarity values of a respective input label.

13. The system of claim 8, wherein the one or more feature labels are organized in one or more hierarchies.

14. The system of claim 13, wherein, to learn the one or more sub-labels associated with the label, the method further comprises performing a second round of similarity-based determination process for the label.

15. A non-transitory computer-readable storage medium storing instructions which when executed by a computer system cause the computer system to perform a method for facilitating multi-label classification for a machine learning mechanism, the method comprising:
    storing a set of training vectors, wherein a respective vector represents an object, wherein a respective vector is associated with one or more feature labels that belong to a label set, and wherein a respective feature label corresponds to a feature of the object;
    receiving an input vector representing a human-recognizable input object, wherein the input vector is associated with a set of input labels, and wherein a respective input label corresponds to an input feature of the input object; and
    classifying the input object using the machine learning mechanism, independently of supervision, on the computer system;
    wherein the machine learning mechanism performs the classification based on the set of input labels by:
        sampling the set of training vectors to select a subset of training vectors representative of the set of training vectors for the set of input labels, thereby reducing computational complexity for subsequent operations;
        determining a similarity value between a respective input label and the subset of training vectors to generate a set of similarity values for the input label, thereby generating a plurality of sets of similarity values corresponding to the set of input labels, wherein the set of similarity values indicates a likelihood of an input feature indicated by the input label being associated with the input object;
        normalizing and aggregating a respective set of similarity values of the plurality of sets of similarity values associated with a respective input label;
        learning one or more input labels from the set of input labels for the input object based on the corresponding sets of normalized and aggregated similarity values; and
        recursively learning one or more sub-labels associated with a respective label of the one or more input labels, wherein learning a respective sub-label comprises determining a set of similarity values for the sub-label with respect to the subset of training vectors.

16. The non-transitory computer-readable storage medium of claim 15, wherein prior to learning the input labels, the method further comprises associating the respective normalized and aggregated set of similarity values to a corresponding feature label in the subset of training vectors.

17. The non-transitory computer-readable storage medium of claim 16, wherein the method further comprises ranking a respective input label based on a corresponding normalized and aggregated set of similarity values.

18. The non-transitory computer-readable storage medium of claim 15, wherein the method further comprises predicting a number of the features associated with the object based on the corresponding sets of similarity values.

19. The non-transitory computer-readable storage medium of claim 15, wherein the one or more feature labels are organized in one or more hierarchies.

20. The non-transitory computer-readable storage medium of claim 15, wherein the machine learning mechanism performs the classification based on the set of input labels further by learning a threshold function based on the set of training vectors; and
    wherein learning the one or more input labels further comprises applying the threshold function to the corresponding set of similarity values of a respective input label.

* * * * *